United States Patent [19]

Nagasawa et al.

[11] Patent Number: 4,496,685

[45] Date of Patent: Jan. 29, 1985

[54] ADHESIVE COMPOSITION

[75] Inventors: Takashi Nagasawa, Daito; Tiaki Nakata, Ibaraki, both of Japan

[73] Assignees: Sumitomo Chemical Company, Limited; Taoka Chemical Company, Limited, both of Osaka, Japan

[21] Appl. No.: 618,413

[22] Filed: Jun. 7, 1984

[51] Int. Cl.$^3$ ................................................ C08K 5/49
[52] U.S. Cl. ..................................... 524/708; 526/204; 526/217; 526/220; 526/298
[58] Field of Search ................ 524/708; 526/204, 217, 526/298, 179, 220

[56] References Cited

U.S. PATENT DOCUMENTS

| | | | |
|---|---|---|---|
| 2,765,332 | 10/1956 | Coover, Jr. et al. | 526/298 |
| 3,527,841 | 9/1970 | Wicker, Jr. et al. | 526/298 |
| 3,654,239 | 4/1972 | McIntire et al. | 526/217 |
| 4,124,557 | 11/1978 | Dieck et al. | 524/708 |
| 4,424,327 | 1/1984 | Reich et al. | 526/204 |
| 4,450,265 | 5/1984 | Harris | 526/298 |

Primary Examiner—Paul R. Michl
Assistant Examiner—Alex H. Walker
Attorney, Agent, or Firm—Birch, Stewart, Kolasch & Birch

[57] ABSTRACT

An adhesive composition comprising an alpha-cyanoacrylate monomer and a phosphazene compound incorporated therein and improved in storage stability without deterioration of the adhesion rate and the adhesive strength.

7 Claims, No Drawings

ADHESIVE COMPOSITION

The present invention relates to an adhesive composition. More particularly, it relates to an alphacyanoacrylate adhesive composition improved in stability.

Alpha-Cyanoacrylate monomers are employed as the adhesive ingredients in instantaneous adhesive compositions. Thus, the adhesive compositions comprising alpha-cyanoacrylate monomers show a quite rapid adhesion rate and are widely used for adhesion of various materials including metals, plastics, rubbers, etc. On the other hand, those adhesive compositions are insufficient in storage stability.

For improvement of the storage stability of alpha-cyanoacrylate adhesive compositions, it has been proposed to incorporate such gaseous or gasifiable materials such as $SO_2$, NO, HF, $CO_2$, etc. therein. In fact, those gaseous or gasifiable stabilizers exert a sufficient stabilizing effect even when used in very small amounts. However, they afford a serious influence on and produce a great variation of the adhesion rate even in such small concentrations as 0.01 to 0.001% by weight. In order to assure constant exertion of good performances (e.g. constant and instantaneous adhesion rate) of alpha-cyanoacrylate adhesive compositions avoiding this influence, it is necessary to use the gaseous or gasifiable stabilizers in strictly constant amounts. In view of their gaseous or gasifiable properties, such incorporation as constant amounts is quite difficult. In addition, the gaseous or gasifiable stabilizers once incorporated are more or less vaporize during storage so that their concentrations in the adhesive compositions vary, and the stability and the adhesion rate are thus changed.

Besides the gaseous or gasified stabilizers, liquid or solid acidic substances are frequently used (cf. Japanese Patent Publication (examined) Nos. 35291/1970, 41520/1970, 13729/1971 and 37278/1971 and Japanese Patent Publication (unexamined) Nos. 13644/1972 and 136285/1980). In general, strong acidic substances show a great stabilizing effect, but the adhesion rate, as well as the adhesive strength, deteriorate. Weak acidic substances do not produce the deterioration of the adhesion rate and the adhesive strength, but the gellation of alpha-cyanoacrylate monomers resulting in an increase of the viscosity of the adhesive compositions takes place during storage over a long period of time. Also, boron fluoride complexes are sometimes used (cf. Japanese Patent Publication (unexamined) No. 52949/1981), but their stabilizing effect is insufficient and their smell is unfavorably strong. Further, some other stabilizers are known, but they are accompanied by some certain disadvantages such as coloring of the adhesive compositions during the storage, whereby the commercial value is negatively affected.

As a result of extensive study seeking an excellent stabilizer which can enhance the storage stability of an alpha-cyanoacrylate adhesive composition without affording any unfavorable influence on its performances, it has now been found that a phosphazene compound is quite suitable for such a purpose.

According to the present invention, there is provided an adhesive composition comprising an alpha-cyanoacrylate monomer as an essential adhesive ingredient and a phosphazene compound as a stabilizer incorporated therein.

Since the phosphazene compound does not vaporized on storage, its stabilizing effect can be exerted constantly and continuously over a long period of time. Further, the phosphazene compound does not substantially afford any unfavorable influence on the adhesion rate or the adhesive strength of the adhesive composition. Particularly notable is that the adhesive composition as stabilized by the phosphazene compound can assure the instantaneous adhesion of various materials at room temperature with a high adhesive strength even after storage over a long period of time. It is also notable that no change in appearance is observed on the stabilized adhesive composition even after storage for a long time. It is further notable that the thermal aging resistance of the adhesive composition at such a temperature as from 50° to 100° C. is increased by the incorporation of the phosphazene compound. In addition, it may be noted that the incorporation of the phosphazene compound can impart non-flammability to the adhesive composition.

As the alpha-cyanoacrylate monomer which is the essential adhesive ingredients in the adhesive composition of the invention, there is usually employed an alpha-cyanoacrylate ester, particularly the one of the formula:

wherein R is alkyl (e.g. methyl, ethyl, propyl, butyl), alkenyl (e.g. allyl, pentenyl), cycloalkyl (e.g. cyclopentyl, cyclohexyl), phenyl, haloalkyl (e.g. chloromethyl, chloroethyl, chloropropyl), alkoxyalkyl (e.g. methoxyethyl, ethoxyethyl, ethoxypropyl), tetrahydrofuryl or the like. In these groups, the terms "alkyl", "alkenyl" and "alkoxy" used alone or in combination with any other term are intended to mean those having not more than 12 carbon atoms, particularly not more than 8 carbon atoms, more particularly not more than 6 carbon atoms in the case of non-cyclic groups and 3 to 6 carbon atoms in the case of cyclic groups.

Specific examples of the alpha-cyanoacrylate ester are methyl alpha-cyanoacrylate, ethyl alpha-cyanoacrylate, propyl alpha-cyanoacrylate, butyl alpha-cyanoacrylate, amyl alpha-cyanoacrylate, allyl alpha-cyanoacrylate, methoxyethyl alpha-cyanoacrylate, and ethoxyethyl alpha-cyanoacrylate, etc.

The term "phosphazene compound" is intended to mean phosphazene (i.e. a ring or chain polymer that contains alternating phosphorus and nitrogen atoms, with two substituents on each phosphorus atom; characteristic structures are cyclic trimmers, cyclic tetramers, and high polymers; the substituent can be a wide variety of organic groups, halogen, amino, etc.) and its derivatives. Specific examples are polyphenoxyphosphazene, bisphenol A-phenol phosphazene, phenoxyphosphazene, p-chlorophenoxyphosphazene, tris(o-phenylenedioxy)phosphazene, n-butoxyphosphazene, and isopropoxyphosphazene. The amount of the phosphazene compound to be incorporated may be from 10 to 100,000 ppm, preferably from 100 to 5,000 ppm, to the alpha-cyanoacrylate monomer. When its amount is less than 10 ppm, the storage stability of the adhesive composition is not improved. When it is more than 100,000 ppm, the initial adhesive rate is slow and the initial adhesive strength is lowered.

The adhesive composition of the invention may be prepared by mixing the alph-cyanoacrylate monomer with the phosphazene compound. It may contain additionally any conventional polymerization inhibitor such as an anion polymerization inhibitor (e.g. SO$_2$) or a radical polymerization inhibitor (e.g. hydroquinone, hydroquinone monomethyl ether, 2,6-di-t-butyl-p-cresol). It may further contain other conventional additives such as a thickener, a plasticizer, a coloring agent, a surfactant, a strength-improving agent and a solvent.

The present invention will be hereinafter explained further in detail by the following Examples.

EXAMPLES 1 TO 13 AND COMPARATIVE EXAMPLES 1 TO 5

A mixture of ethyl alpha-cyanoacrylate with a phosphazene compound, SO$_2$ or hydroquinone in an amount as shown in Table 1 was prepared while shaking to obtain an adhesive composition. This composition was filled in a 20 ml polyethylene bottle and stored at 20° C. for three or six months. Thereafter, the composition was subjected to measurement of viscosity, adhesion rate and adhesive strength.

For determination of the storage stability, the adhesive composition (20 g) was filled in the same bottle as above, kept at 70° C. in a thermostat with internal air circulation for 7 days and then subjected to measurement of viscosity. Also, the adhesive composition (3.5 ml) was filled in a 5 ml glass tube and kept at 85° C. in a thermostat with internal air circulation to determine the number of days until the gelation took place.

The adhesion rate and the adhesive strength were determined according to JIS (Japanese Industrial Standards) K 6861 "Test Methods for Cyanoacrylate Adhesives". The viscosity was measured at 20° C. by the aid of a rotary viscometer.

The results are shown in Table 1, from which it is clear that the performances of the alpha-cyanoacrylate adhesive composition containing the phosphazene compound according to the invention are not deteriorated even after the storage over a long period of time, and the phosphazene compound exerts an excellent stabilizing effect in the alpha-cyanoacrylate adhesive composition.

Each of the adhesive compositions in Examples 11 to 13 as well as Comparative Example 4 was molded to make a film, which was subjected to test for flammability of plastic material according to UL (Underwriters Laboratory Inc., U.S.A.) 94-V. As the result, the specimen of Comparative Example 4 was flammable, while the specimens of Examples 11 to 13 were non-flammable (UL 94V-1).

TABLE 1

| | Phosphazene compound | | SO$_2$ (ppm) | Hydroquinone (ppm) | Adhesive rate (sec) | Adhesive strength in storage at 20° C. (kgf/cm$^2$) | | | Viscosity in storage at 20° C. (cps) | | | Viscosity in storage at 70° C. for 14 days (cps) | Days until gelation at 85° C. (day) |
|---|---|---|---|---|---|---|---|---|---|---|---|---|---|
| | Name | Amount (ppm) | | | | Before storage | Three months | Six months | Before storage | Three months | Six months | | |
| Comparative | | | | | | | | | | | | | |
| 1 | — | | 0 | 0 | 0 | 10 | 70 | Gelled | Gelled | 2.5 | Gelled | Gelled | Gelled | 1 |
| 2 | — | | 0 | 0 | 1000 | 10 | 81 | Gelled | Gelled | 2.5 | Gelled | Gelled | Gelled | 1 |
| 3 | — | | 0 | 5 | 0 | 15 | 90 | 83 | 81 | 2.5 | 6.8 | 70 | 26 | 2 |
| 4 | — | | 0 | 5 | 1000 | 15 | 93 | 90 | 91 | 2.5 | 3.5 | 12 | 13 | 3 |
| 5 | — | | 0 | 20 | 1000 | 30 | 140 | 139 | 156 | 2.5 | 2.5 | 2.5 | 2.5 | 16 |
| Example | | | | | | | | | | | | | |
| 1 | Tris(o-phenylenedioxy)phosphazene | 100 | 0 | 1000 | 10 | 123 | 123 | 126 | 2.5 | 2.5 | 3.0 | 5.0 | 2 |
| 2 | Tris(o-phenylenedioxy)phosphazene | 500 | 0 | 1000 | 10 | 131 | 129 | 133 | 2.5 | 2.5 | 2.5 | 2.5 | 12 |
| 3 | Tris(o-phenylenedioxy)phosphazene | 1000 | 0 | 1000 | 10 | 129 | 141 | 139 | 2.5 | 2.5 | 2.5 | 2.5 | 12 |
| 4 | Tris(o-phenylenedioxy)phosphazene | 1000 | 0 | 0 | 10 | 138 | 143 | 150 | 2.5 | 2.5 | 3.0 | 2.5 | 8 |
| 5 | Phenoxyphosphazene | 500 | 0 | 1000 | 10 | 133 | 133 | 140 | 2.5 | 2.5 | 2.5 | 2.5 | 9 |
| 6 | Tris(o-phenylenedioxy)phosphazene | 100 | 5 | 1000 | 15 | 141 | 136 | 131 | 2.5 | 2.5 | 3.0 | 2.5 | 8 |
| 7 | Tris(o-phenylenedioxy)phosphazene | 500 | 5 | 1000 | 15 | 143 | 139 | 138 | 2.5 | 2.5 | 2.5 | 2.5 | 14 |
| 8 | Tris(o-phenylenedioxy)phosphazene | 1000 | 5 | 1000 | 15 | 139 | 151 | 141 | 2.5 | 2.5 | 2.5 | 2.5 | 13 |
| 9 | Tris(o-phenylenedioxy)phosphazene | 1000 | 5 | 0 | 15 | 138 | 141 | 150 | 2.5 | 2.5 | 2.5 | 2.5 | 8 |
| 10 | Phenoxyphosphazene | 500 | 5 | 1000 | 15 | 135 | 130 | 149 | 2.5 | 2.5 | 2.5 | 2.5 | 9 |
| 11 | Tris(o-phenylenedioxy)phosphazene | 50000 | 0 | 1000 | 15 | 141 | 128 | 135 | 2.5 | 2.5 | 3.0 | 4.0 | 4 |
| 12 | Tris(o-phenylenedioxy)phosphazene | 50000 | 0 | 0 | 15 | 127 | 140 | 133 | 2.5 | 2.5 | 3.5 | 5.0 | 3 |
| 13 | Tris(o-phenylenedioxy)phosphazene | 50000 | 5 | 1000 | 20 | 144 | 141 | 137 | 2.5 | 2.5 | 2.5 | 2.5 | 6 |

EXAMPLES 14 AND 15 AND COMPARATIVE EXAMPLE 6

The adhesive compositions as prepared in Examples 8 and 10 and Comparative Example 4 were kept at a predetermined temperature for 24 hours and, thereafter, subjected to measurement of tensile shear strength.

The results are shown in Table 2, from which it is clear that the adhesive composition of the invention has superior thermal aging resistance.

TABLE 2

| | Example | | (unit: kgf/cm²) Comparative |
|---|---|---|---|
| | 14 | 15 | 6 |
| Adhesive composition prepared in | Example 8 | Example 10 | Comparative Example 4 |
| Phosphazene compound | Tris(O—phenylenedioxy)phosphazene | Phenoxyphosphazene | — |
| Temperature for exposure (°C.) 20 | 130 | 125 | 140 |
| 50 | 135 | 115 | 100 |
| 70 | 140 | 138 | 95 |
| 100 | 110 | 100 | 65 |
| 130 | 35 | 38 | 30 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An adhesive composition comprising an alpha-cyanoacrylate monomer and a phosphazene compound incorporated therein.

2. The adhesive composition according to claim 1, where in alpha-cyanoacrylate monomer is a compound of the formula:

$$CH_2=\underset{CN}{\underset{|}{C}}-COOR \qquad (I)$$

wherein R is alkyl, alkenyl, cycloalkyl, phenyl, halogalkyl, alkoxyalkyl or tetrahydrofurfuryl.

3. The adhesive composition according to claim 2, wherein the alpha-cyanoacrylate monomer is chosen from methyl alpha-cyanoacrylate, ethyl alpha-cyanoacrylate, propyl alpha-cyanoacrylate, butyl alpha-cyanoacrylate, allyl alpha-cyanoacrylate, methoxyethyl alpha-cyanoacrylate, ethoxyethyl alpha-cyanoacrylate and amyl alpha-cyanoacrylate.

4. The adhesive composition according to claim 1, wherein the phosphazene compound is chosen from polyphenoxyphosphazene, bisphenol A-phenol phosphazene, phenoxyphosphazene, p-chlorophenoxyphosphazene, tris(o-phenylenedioxy)phosphazene, n-butoxyphosphazene and isopropoxyphosphazene.

5. The adhesive composition according to claim 1, wherein the amount of the phosphazene compound to be incorporated is from 10 to 100,000 ppm to the alpha-cyanoacrylate monomer.

6. The adhesive composition according to claim 5, wherein the amount of the phosphazene compound is from 100 to 5,000 ppm.

7. The adhesive composition according to claim 1, which comprises additionally a polymerization inhibitor.

* * * * *